June 2, 1959   E. C. HARDESTY ET AL   2,888,969
TOMATO PEELING MACHINE
Filed Oct. 19, 1953   7 Sheets-Sheet 3

June 2, 1959

E. C. HARDESTY ET AL 2,888,969

TOMATO PEELING MACHINE

Filed Oct. 19, 1953

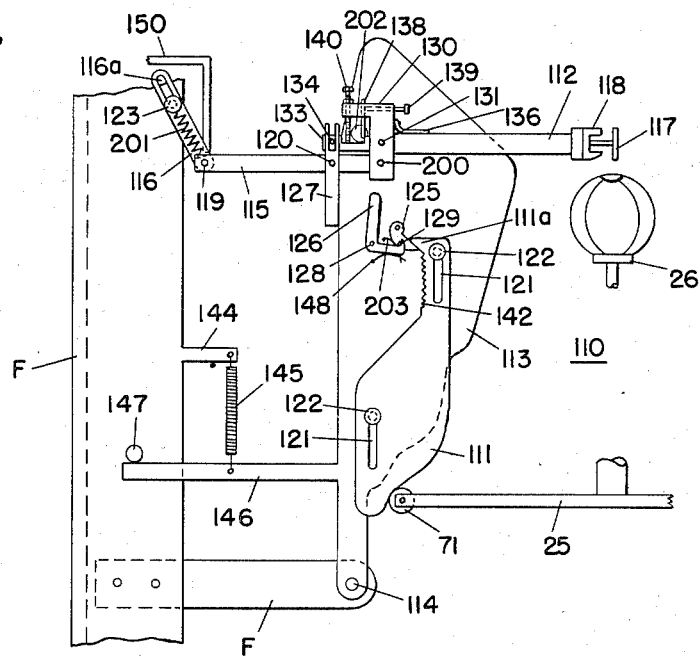
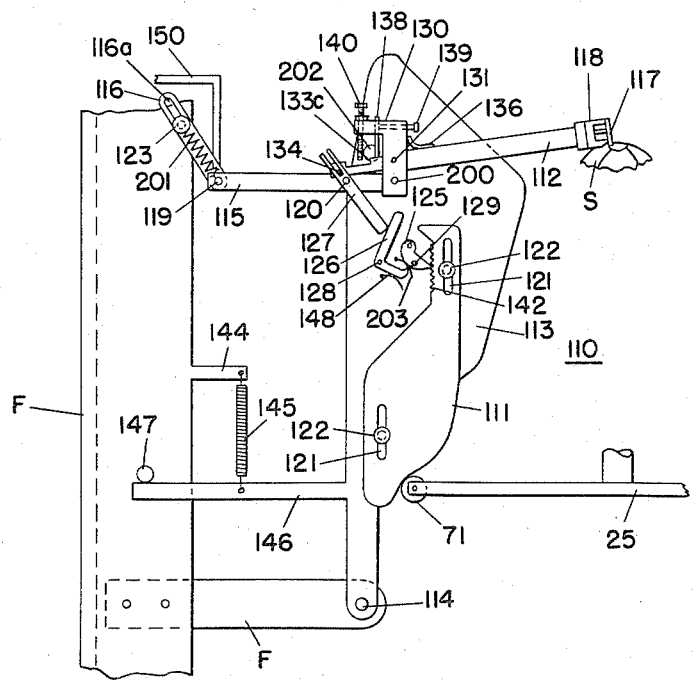

June 2, 1959  E. C. HARDESTY ET AL  2,888,969
TOMATO PEELING MACHINE
Filed Oct. 19, 1953  7 Sheets-Sheet 6

June 2, 1959  E. C. HARDESTY ET AL  2,888,969
TOMATO PEELING MACHINE
Filed Oct. 19, 1953  7 Sheets-Sheet 7

United States Patent Office 2,888,969
Patented June 2, 1959

2,888,969

TOMATO PEELING MACHINE

Edwin C. Hardesty and William E. Stalhuth,
Baltimore, Md.

Application October 19, 1953, Serial No. 386,896

11 Claims. (Cl. 146—43)

This invention relates to apparatus for skinning or peeling fruits or vegetables and has for an object the provision of novel apparatus for removing the skin from fruits or vegetables while maintaining the meat substantially whole and undamaged.

Many prior art arrangements have been devised for removing the skin from fruits or vegetables, such for example as tomatoes; however, the various prior art arrangements have left something to be desired in that they have not been entirely satisfactory.

In peeling or skinning fruits or vegetables of the thin-skinned variety, such as tomatoes, preparatory to canning or for other purposes, difficulty arises in removing the skins from the meat without damaging the meat or without leaving part of the skin clinging to the meat after the skinning operation has supposedly been completed. Further complications have arisen in the foregoing operation since it is necessary that the operations be carried on at a relatively high rate of speed in order that the cost of the finished product will not be too great for commercial purposes. Some of the prior art arrangements for removing or peeling the skins from tomatoes have involved the use of a rotatable drum having a plurality of pairs of rollers forming the shell of the drum with the adjacent rollers being rotatable in opposite directions to catch any loose ends of the skin on the tomato in a random fashion. Other prior art arrangements have involved the use of such devices as a peeling belt provided with teeth or spurs for scraping the skin from the tomatoes while the tomatoes are carried on a conveyor and rotated about their own axes. Another prior art arrangement for removing the skins from tomatoes has been the use of a plurality of claws carried by an endless chain for scraping the skins from the tomatoes. While the various prior art arrangements have been successful to some extent, they have been subject to the common disadvantage of applying an abrasive action to the fruit or vegetables, which action has caused damage to the meat. As the various prior art arrangements have involved a random removal of the skin from the meat, there has been no assurance that all of the skin would be removed at the completion of the skinning operation by such machines. Furthermore, the prior art machines have not been successful in removing the blemishes, roots and other imperfections appearing in the skin, and it has been necessary to remove them by a subsequent hand operation.

In accordance with the present invention, there are provided improved apparatus for skinning fruit or vegetables while maintaining the meat whole and undamaged by scoring the skin for division into a predetermined number of segments, gripping the skin segments and concurrently pulling them from the fruit or vegetables in a predetermined path to separate the skin from the meat in substantially whole segments and to remove therewith any roots, blemishes or other imperfections appearing in the skins.

In another aspect of the invention, there is provided apparatus for peeling fruit or vegetables while maintaining the meat whole and undamaged comprising a conveyor operable through a closed path and having a plurality of spaced supports for the fruit or vegetables, means for coring the fruit or vegetables, means for scoring the skins of the fruit or vegetables into a plurality of segments, means for removing the tops from the fruit or vegetables, means for treating the skin of the fruit or vegetables to loosen the skin with respect to the meat, and means for peeling the skins from the fruit or vegetables, all of said means being arranged with respect to the endless conveyor for successively operating on the fruit or vegetables while they are being conveyed on said supports.

For a more detailed disclosure of the invention and for further objects and advantages thereof, reference is to be had to the following description taken in conjunction with the accompanying drawings in which:

Figs. 7–10 are elevation views on enlarged scale of the peeling mechanism of zone V in Fig. 1 with the parts thereof in different positions of operation;

Figure 1:
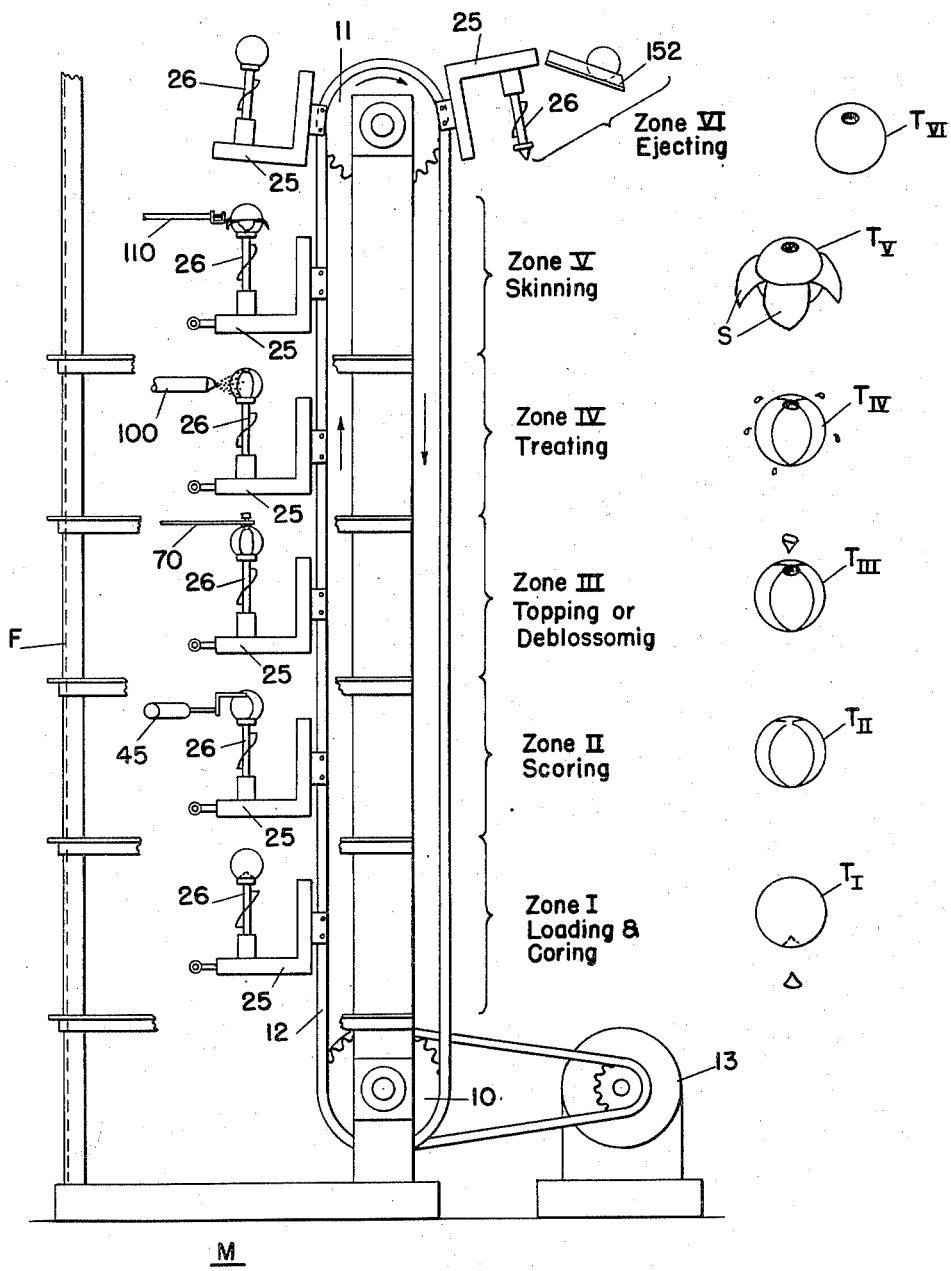
Fig. 1 is a diagrammatic view of a system embodying the present invention and shown as including a plurality of working zones, namely, zone I—loading and coring, zone II—scoring, zone III—topping or deblossoming, zone IV—treating, zone V—skinning, and zone VI—ejecting.

Referring now to the drawings, there is diagrammatically shown in Fig. 1 a machine M embodying the present invention. Machine M includes a frame F which supports a pair of gears 10 and 11 over which passes an endless chain member 12 forming an endless conveyor. The endless conveyor 12 is provided with a plurality of supports 25 for supporting individual fruits or vegetables, such, for example, as tomatoes. The conveyor is adapted to be driven from a suitable means such as a drive motor 13 and preferably the driving means is of the continuous type so that the individual tomatoes will be continuously conveyed through the machine M during a skinning or peeling operation. The machine M includes a plurality of vertically disposed working zones or sections within which various operations are performed on the tomatoes as they are moved through the successive zones of the machine.

As shown in Fig. 1, the bottom zone, or zone I of the machine, is the zone in which the loading and coring operations take place, as later to be described. The tomato $T_I$ diagrammatically illustrates a tomato from which the core has been removed. The next zone of the machine is the scoring zone, and has been identified as zone II. The tomato $T_{II}$ diagrammatically illustrates a tomato that has been cored and the skin of which has been scored into a plurality of segments. The next zone of the machine is the zone in which the topping or deblossoming operation is performed, and is identified as zone III. The tomato $T_{III}$ diagrammatically illustrates a tomato that has been cored, scored and deblossomed. After the tomatoes have been deblossomed, they are next conveyed through the treating zone, or zone IV of the machine. In this zone the skins of the tomatoes are treated, preferably scalded with steam or hot water, to loosen the skin with respect to the meat of the tomato. The tomato $T_{IV}$ diagrammatically illustrates a tomato that has been cored, scored, deblossomed and treated. After leaving the treating zone, the tomatoes pass through the skinning or peeling zone, designated in Fig. 1 as zone V which includes novel skinning mechanism as later to be described. In this zone, the skin segments are concurrently removed from the tomato by pulling them through a predetermined path. The tomato $T_V$ diagrammatically illustrates a tomato that has been cored, scored, deblossomed, treated and peeled. After the tomatoes have had their skins removed in zone V, they are then moved to zone VI, the ejecting zone, where the tomatoes are removed from the machine. The tomato $T_{VI}$ diagrammatically illustrates a tomato that has been cored, scored, deblossomed, treated, skinned and ejected from the machine M. The tomato $T_{VI}$ is now ready for cooking, canning, etc.

With the foregoing understanding of the general operation of machine M, the various operations taking place on the tomatoes in the different zones of machine M and the associated mechanism will now be described in detail.

Zone I.—Loading and coring

Figure 2:
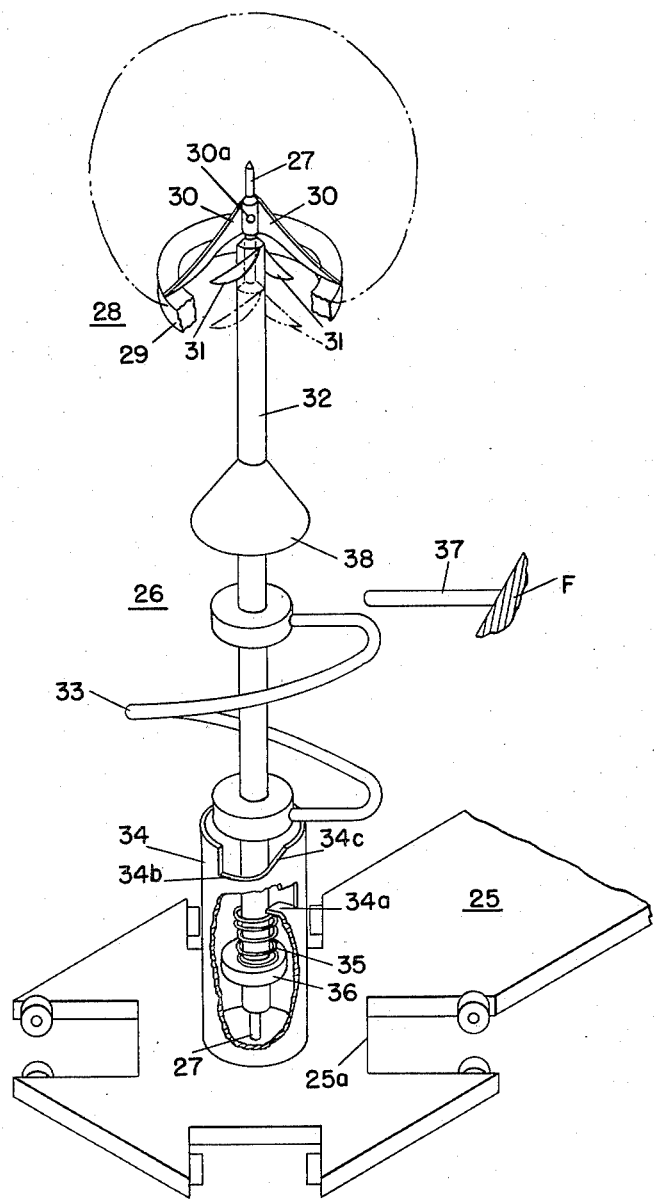
Fig. 2 is a perspective view on enlarged scale of the loading and coring zone I in Fig. 1.

As shown in Fig. 1, the endless conveyor is provided with a plurality of supports 25 for supporting the individual tomatoes as they are continuously conveyed through the machine during a skinning operation. The individual supports 25 are adapted to extend perpendicularly from the conveyor, and as may be seen in Fig. 2 are provided at their free end with a particular configuration, the purpose of which will hereinafter be described. Each of the supports 25 is adapted to support at its free end in a substantially vertical position a fixture 26. The fixture 26 has a dual function in that it serves as a support for the tomatoes as they are conveyed through the various zones of the system and has the further function of including means for coring the tomatoes after they have been placed on the fixture and while they are passing through the coring zone of the machine M.

As shown in Fig. 2, fixture 26 comprises a central rod 27 that is secured at its lower end to the support 25 and is adapted to extend the full length of the fixture mechanism. At the top end of rod 27, there is provided a holder 28 comprising a base-ring 29 and a plurality of vanes 30, the holder unit being secured to the top end of rod 27 in any suitable manner as by a set screw 30a. The holder 28 is adapted to support a tomato in a vertical position with the rod 27 extending axially of the tomato. The tomato is impaled with its core disposed downwardly on the vane members 30 until the base-ring 29 engages the bottom portion of the tomato. The vane members 30 will prevent rotation of the tomato by the rotary action of the cutter blades 31 during the coring operation now to be described.

The cutter blades 31 are carried at the upper end of a tubular member 32 that is rotatably mounted on rod 27. The tubular member 32 is somewhat shorter than rod 27 and is also movable vertically with respect to rod 27. In order to rotate the tube 32, and thus the cutters 31, there is secured to the tube 32 a spiral member 33 arranged to have its lower end engage the upper edge of a tubular housing 34. The housing member 34 includes an inner shoulder 34a and the spiral member 33 is held against the top edge of the tubular housing 34 due to the bias created by the coil spring 35 surrounding the lower end of tube 32 and exerting a downward force on the latter due to the action of the spring 35 between the housing shoulder 34a and the collar 36 carried at the lower end of tube 32. The latter arrangement may be seen through the cut-away section in housing 34, Fig. 2.

To actuate the coring mechanism, there is provided a fixed stop member 37 secured to the frame F of the machine M. As the conveyor 12 moves forward in a clockwise direction, the supports 25 and their corresponding fixtures 26 are successively moved upwardly through the coring zone of the machine. The upper portion of spiral member 33 is brought into engagement with the fixed stop 37, and due to the configuration of the spiral member 33, the latter will be caused to rotate in a counterclockwise direction as viewed from above. The spiral member 33 and the tube 32 to which the spiral member 33 is secured will rotate together, thereby imparting rotation to the cutters 31 which are presently disposed in their upper position near the bottom of the core of the tomato held by holder 28. At the beginning of the coring operation, the lower end of spiral member 33 is in its normal position resting on the flat portion 34b of the cam surface on the upper edge of housing 34, and the cutters 31 are in their lower position as shown in phantom in Fig. 2. After the spiral member 33 has rotated a distance corresponding with the flat portion 34b, it will engage the inclined portion 34c of the cam surface, whereupon the spiral member 33 is raised to a higher elevation, thus raising the tubular member 32 and consequently the cutters 31. The raising of the cutters 31 causes them to pierce the bottom of the tomato at the core area, and as the spiral member 33 continues to rotate at the raised elevation, the cutters 31 will likewise rotate and cut the core from the tomato. When the spiral member 33 has traversed the complete periphery of the upper end of tubular housing 34, the spiral member will again reach the drop-off point of the cam surface and will resume its initial position at the low point 34b, thus lowering the cutter blades 31 from the bottom of the tomato and thereby completing the coring operation. As there are provided a plurality of cutter blades 31, the tomato core will be cut into a corresponding plurality of segments; and as the core segments are cut from the tomato, they will be thrown down on the shield member 38 and deflected out of the path of movement of the fixture 26.

When the spiral member 33 completes its cycle of revolution, the stop member 37 will no longer engage the spiral member, and by reason of the cut-away portion 25a in the support 25, there is avoided interference between the latter and the stop member 37 as the conveyor moves the support 25 through the coring zone to the second zone of the machine, namely, the scoring zone.

Zone II—Scoring

Figure 3:
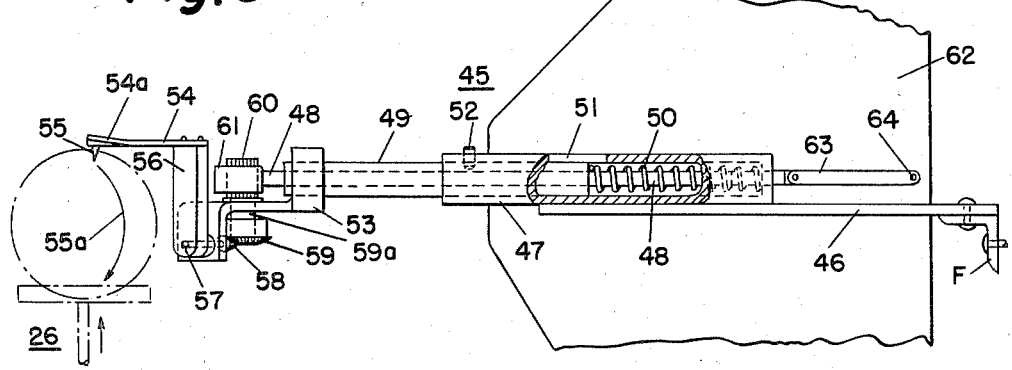
Fig. 3 is a fractional elevation view on enlarged scale of the scoring mechanism of zone II in Fig. 1.
Figure 4:
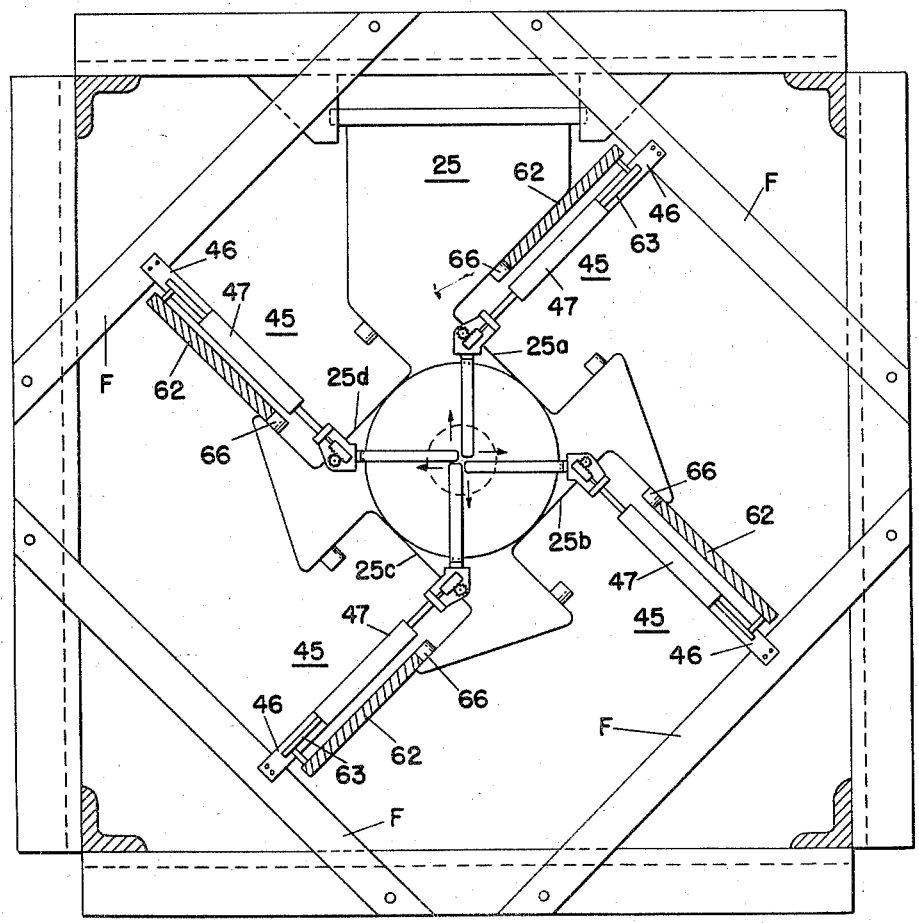
Fig. 4 is a plan view of the scoring zone II in Fig. 1.

After the cored tomato leaves the coring zone I of the machine, it enters the scoring zone II within which is arranged the scoring mechanism 45 illustrated in Figs. 3 and 4. A separate mechanism 45 is provided for performing each of the scoring operations on the tomato skin, the number of mechanisms 45 supplied being determined by the number of segments into which the skin is to be divided. While the skin may be divided into any predetermined number of segments, it is preferable that it be divided into a number between three and eight with the spaced score lines extending radially from one end of the tomato to the other. The greater number of segments into which the skin is divided requires a correspondingly greater number of scoring mechanisms 45 and stripping mechanisms 110 as later to be described; and thus from a cost and space standpoint it is preferable that the number of segments be confined within practical limits. A preferred arrangement has been illustrated in Fig. 4 wherein the tomato skin is to be divided into four segments, and thus four scoring mechanisms 45 have been shown. These scoring mechanisms 45 are of identical construction and each operates in the same manner. The object of the scoring mechanisms 45 is to concurrently score the tomato skin along the lines indicated by the four arrows in Fig. 4. Each of the scoring mechanisms 45 is supported from the frame F of the machine as by a bracket 46 with the various mechanisms 45 being arranged in equally spaced relation surrounding the path of movement of the fixtures 26 that support the individual tomato.

Each of the mechanisms 45 comprises a tubular member 47 through which there extends a rod 48, the tubular member 47 being fixed to the bracket 46. At the outer end of rod 48, there is provided a tube 49, and both the tube 49 and rod 48 are arranged to reciprocate within tubular member 47. The tube 49 is biased towards an extended position by means of a compression spring 50 within tubular member 47 which abuts against one end of the tubular member 47 and one end of tube 49. In order to prevent the tube 49 from being thrust out of the inside of tubular member 47, the latter is provided with a slot 51 through which is inserted a pin 52 which controls the extent of movement of tube 49. This arrangement also prevents the tube 49 from rotating about rod 48, and thus insures a reciprocatory action. Secured to the opposite end of tube 49 is a supporting member 53 which supports the scoring finger 54. The scoring finger 54 has been shown as a right angle member, the horizontal portion of which is made from a flexible material such as spring steel and at the outer end of which is carried the scoring member 55. The vertical portion 56 of the scoring finger 54 is rotatable around its lower end, the latter being carried by a shaft 57 extending through support 53. The shaft 57 is provided at its opposite end with a bevel gear 58 which in turn meshes with a bevel gear 59 which is disposed at the opposite end of a shaft 59a carrying pinion 60. Both the bevel gear 59 and the pinion 60 are carried by support 53, and the pinion 60 is adapted for engagement with a rack 61 carried by the outer end of rod 48. The inner end of rod 48 is connected to a cam 62 by means of a link 63 and pin 64. Thus, upon movement of cam 62, movement likewise will be imparted to rod 48.

The operation of the scoring mechanisms 45 will now be described. As one of the supports 25 moves into the scoring zone, the rollers 66 carried by the support 25 will engage the corresponding cams 62, thereby forcing the cams in a direction away from the path of movement of the tomatoes. Prior to engagement of the rollers 66 with the corresponding cams 62, the rising tomato will contact the flexible horizontal portion of scoring finger 54 and the pointed scoring member 55 will pierce the skin at the top of the tomato. The depth to which the scoring member 55 will penetrate the skin is controlled by the flatness of the flexible portion 54a of scoring finger 54. The flexible portion 54a of the scoring finger 54 also permits the scoring mechanism readily to accommodate tomatoes varying in size. For the larger tomatoes, the flexible portion 54a will be deflected upwardly out of the horizontal plane before the scoring mechanism 45 is operated by means of roller 66 and cam 62. Cam 62 is pivoted about its lower end and as cam 62 is moved to the right by means of roller 66, the link 63 pinned thereto at 64 will cause rod 48 extending through the mechanism 45 also to move to the right. This movement causes rack 61 to rotate pinion 60 and impart rotary movement to shaft 57 through bevel gears 58 and 59, thereby imparting rotational movement to the scoring finger 54 in a clockwise direction. The rotation of scoring finger 54 about shaft 57 causes the scoring member 55 to operate through a controlled arc 55a, thereby causing the tomato skin to be scored. The scoring action takes place during movement of the rod 48 to the right from its initial position, as shown in Fig. 3, until the rack 61 engages the outer end of tube 49. Until that time the support 53 remains stationary, and the only movement of the scoring finger 54 is rotational movement about shaft 57. When the rack 61 engages the end of tube 49, the scoring of the tomato skin is completed and the only operation remaining at this point is to remove the scoring mechanism 45 from the path of the advancing support 25. Upon further advancement of support 25, the rod 48 will be moved further to the right due to the rise on cam 62 and spring 50 will be compressed, thereby permitting the tube 49 and the support 53 also to move to the right whereby the scoring finger 54 will be withdrawn from the path of movement of the tomatoes and fixtures 26. With the mechanisms 45 withdrawn to the retracted position, the scoring fingers 54 will be in alignment with the cut-away portions 25a—25d of the support 25, thus permitting the support 25 to pass through the scoring zone without interference with the scoring mechanisms 45. After the support 25 has moved beyond the scoring mechanisms 45, the shape of the cams 62 is such that they will move toward the center of the machine, thus restoring the scoring mechanisms 45 to their initial positions with the assistance of the associated compression springs 50. The scoring mechanisms 45 will then be ready for performing a scoring operation on a succeeding tomato and the scored tomato will be moved by the conveyor to zone III of the machine where the topping operation is performed.

Zone III—Topping or deblossoming

In this section of the machine, mechanism is provided for drilling a small conical section from the top of the tomato. This operation is sometimes referred to as deblossoming since the purpose of the operation is to remove the tomato blossom. If the tomato blossom is not removed, it is likely to cause the tomatoes to spoil after they are canned. The removal of the top of the tomato has another purpose in connection with the present invention as it provides circular skin ends across which the gripping fingers straddle in a manner later to be described in connection with zone V of the machine.

Figure 5:
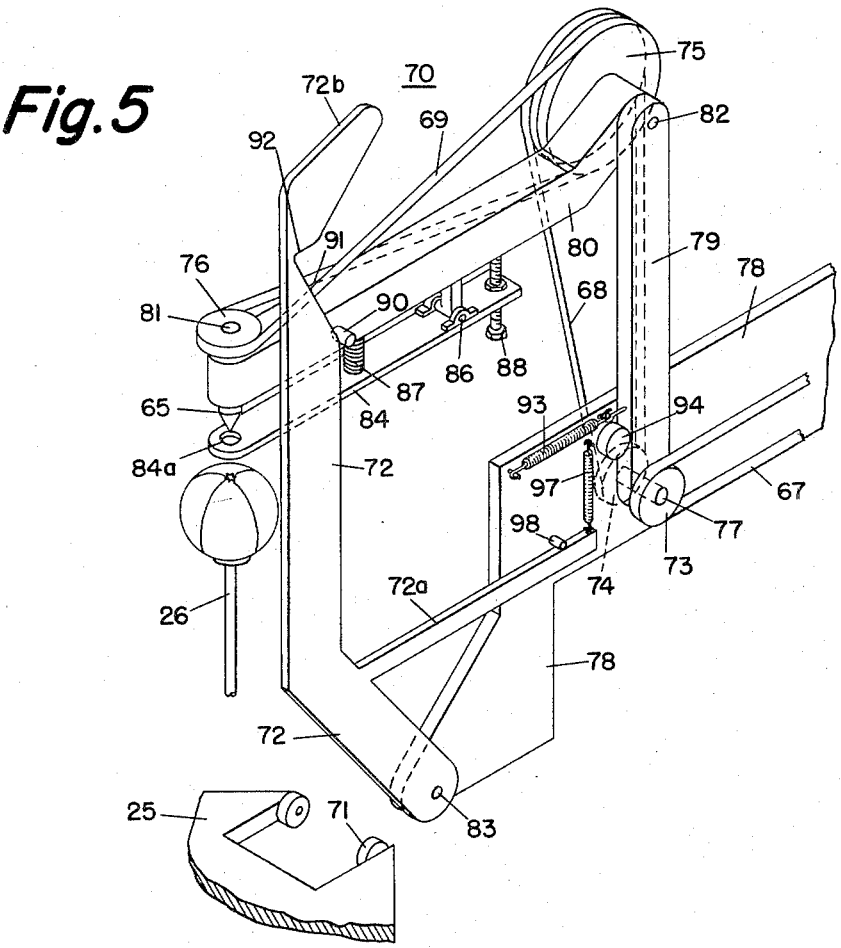
Fig. 5 is a perspective view on enlarged scale of the mechanism utilized for drilling out the top of the fruit or vegetables at zone III in Fig. 1.
Figure 6:
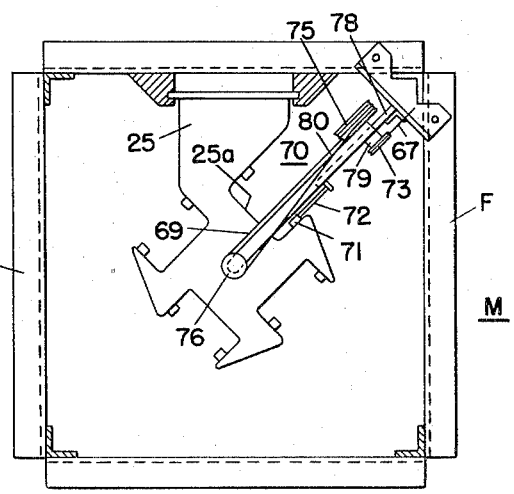
Fig. 6 is a plan view of zone III in Fig. 1.

Referring to Fig. 5, there is shown a topping or deblossoming mechanism 70, and as only one of these mechanisms is required, it is preferably disposed with respect to the path of movement of supports 25 in a manner as shown in Fig. 6. The topping mechanism 70 is operated upon advancement of the conveyor through co-operation of a roller 71 engaging a cam 72 in a manner similar to the cooperation between rollers 66 and cams 62 at zone II of the machine, as previously described. Cam 72 is pivotally supported at its lower end by a pivot 83 carried by a supporting member 78 fixed to the frame of the machine. The tomato is deblossomed by means of the operation of the conical cutting member 65 which is arranged to be driven from the conveyor chain carrying the supports 25 by way of a pulley and belt system including pulleys 73—76 and belts 67—69. As shown in Fig. 5, pulleys 73 and 74 are disposed at opposite ends of a shaft 77 carried by the supporting member 78 fixed to the frame F of the machine M, Fig. 6. Pulley 75, a double pulley, is rotatably carried by a shaft 82 at the end of a link 79 interconnecting shaft 77 and pulley 75, and pulley 76 is carried at the outer end of a link 80, the opposite end of which is connected to pulley 75 and the corresponding end of link 79. Pulley 76 is provided with a shaft 81 extending therethrough, which in turn carries the cutting member 65.

Power is supplied to the cutting member 65 by way of belt 67 that leads to the main drive chain of machine M. In this manner pulley 73 is rotated and this rotation is transferred through shaft 77 to pulley wheel 74. Pulley wheel 74 transmits rotation to pulley wheel 75, as by belt 68, and this rotation is transferred by belt 69 to pulley wheel 76 and thus to cutting member 65.

As the scored tomato is conveyed toward the drilling or topping mechanism 70, it engages a hold-down member 84 in plate form, having disposed therein at a point opposite the cutting member 65 a hole 84a substantially equal in diameter to the diameter of the cutting member 65. The hold-down member 84 is supported from the underneath side of link 80 at pivot 86, the pivotal action of hold-down member 84 being controlled by means of cooperation of a spring 87 and stop member 88 disposed at opposite sides of pivot 86. The purpose of the hold-down member 84 is to hold the ends of the tomato skin while the drilling operation is being performed. This is desirable as it prevents the skin segments from splaying out as the tomato skin has already been scored and a uniformly positioned hole in the skin is required for the subsequent stripping operation to be performed. As the support 25 continues to move the tomato upwardly through the deblossoming zone, the top of the tomato will move the hold-down member 84 upwardly and the cutter 65 will feed into the tomato, drilling out the top.

At this stage of the operation, the top has been drilled out of the tomato and it is necessary to remove the drilling mechanism from the path of the tomato. Accordingly, the roller 71 on support 25 now engages cam 72, and due to the shape of the cam, the latter will be pivoted outwardly of the path of movement of the supports 25. During this pivotal movement a pin 90 carried by link 80 is pushed upwardly along a cam surface 91 near the upper end of cam 72. The angle of rise of cam surface 91 is predetermined so that the rate of rise of link 80 will be greater than the rate of rise of the tomato supporting fixture 26, and as a result the cutting member 65 will be withdrawn from engagement with the tomato even with continued rise of the tomato with the fixture 26.

When pin 90 reaches the end of cam surface 91, it engages a rise 92 where further outward movement of cam 72, due to action of roller 71, will retract the topping mechanism 70 including links 79 and 80 from the path of movement of the tomatoes by pivoting the mechanism about shaft 77 against the bias of spring 93 and moving link 79 away from stop member 94 carried by supporting member 78. By reason of the foregoing action, the topping mechanism 70 is retracted from the path of movement of the tomatoes into alignment with cut-away portion 25a, Fig. 6, thus permitting the support 25 and its fixture 26 with the tomato to pass through the remainder of the deblossoming zone III without interference. The cam 72, Fig. 5 is restored to its initial position by means of the cooperation of spring 97 and stop member 98 after the tomato has been deblossomed and support 25 has moved beyond the deblossoming mechanism 70 so that roller 71 on support 25 can bear along the uppermost inclined surface 72b of cam 72. Both the stop member 98 and spring 97 are carried by supporting member 78, with one end of spring 97 being connected to cam 72 as by arm 72a.

From the foregoing description, it will be seen that the path of movement of the cutting member 65 during the retracting operation will be first in an upwardly direction along an arc about shaft 82 at the inner end of link 80 and then outwardly along a path having a radius about the pivot 83 at the bottom of cam 72.

Zone IV—Treating zone

After the tomatoes have been cored, scored and deblossomed, it is preferable to treat the skins in order to loosen the skin with respect to the meat before stripping the skin from the tomato. This treating action is preferably performed by the use of a hot water or steam bath with the temperature being such that the skins will be readily loosened with respect to the meat. As diagrammatically shown in Fig. 1, there may be provided a suitable arrangement such as a steam spray device 100 for subjecting the tomatoes to a steam bath within zone IV of the machine. After the tomatoes have passed through the treating zone, at zone IV of the machine, they are then ready to enter the stripping zone located at zone V of the machine. The steam spray device or devices 100 provided in zone IV may be either continuously or intermittently operated by a suitable valve in timed relation with movement of conveyor 12.

Zone V—Stripping or skinning zone

When the tomato leaves the treating zone, it is now ready to have the skin removed. The conveyor moves the tomato into the stripping or skinning zone V, Figs. 1, 7–11, where it is operated on by the skinning or peeling mechanisms 110 as will now be described. It will be recalled that during the scoring operation the tomato skin was divided into four segments. Accordingly, in the skinning zone, Fig. 11, there are provided four skinning mechanisms 110 for gripping or pinching the skin segments between each pair of radial score lines and removing the skin segments from the meat of the tomato. The skinning mechanisms 110 are operated by the advancement of the conveyor in a somewhat similar manner to the operation previously described in connection with the cam operation of the scoring mechanisms 45, Figs. 3 and 4. As the tomatoes may not all be of uniform size, provision has been made in accordance with the present invention to vary the operation of the skinning mechanisms 110 in accordance with the size of each individual tomato, by the inclusion of a size-control cam 111 hereinafter to be described. As mentioned above, and as shown in Fig. 11, four skinning mechanisms 110 have been disposed about the path of the conveyor in the skinning zone V of the machine. Since each of the skinning mechanisms 110 works in the same manner and each has the same construction, only one of the mechanisms 110 has been shown in the fractional views of Figs. 7–10, although it is understood that all of the skinning mechanisms 110 operate concurrently on the individual tomato.

Referring to Fig. 7, it will be seen that the support 25 has moved the tomato into zone V of the machine and it is approaching the finger mechanism 112 included in the skinning mechanism 110. The finger mechanism 112 is supported on a main cam 113, the lower end of which is pivotally secured at 114 to the machine frame F. The upper end of the main cam 113 is connected to the machine frame by means of a flexible linkage including an arm 115 and a link 116 pinned together at one of their ends by pin 119, the arm 115 being pivoted at its other end at 200 to cam 113 and the other end of link 116 having a slot 116a and being pivotally pinned to the frame F by pin 123. The tension spring 201 interconnecting pins 119 and 123 biases the lower end of slot 116a against pin 123 causing link 116 to act at this time as a member of fixed length. The finger mechanism 112 includes at its outer end a pair of clamping elements 117 and 118, these elements being adapted to be held in spaced relation until the end of a skin segment is inserted therebetween, at which time a triggering action will take place forcing the elements 117 and 118 together, thereby gripping or pinching the end of the skin segment. As the tomatoes may not be of uniform size, it has been necessary to provide an arrangement whereby the triggering action of the finger mechanism is controlled by the size of the tomato. This action is controlled by the size-control cam 111 supported on the main cam 113 by the pins 122 in cam 113 extending through the slots 121 in cam 111. As one of the rollers 71 on support 25 moves into engagement with its corresponding size-control cam 111, Fig. 7, the latter is lifted vertically by reason of the vertical movement of support 25. At this point in the operation the size-control cam 111 is free to move vertically by reason of its slot and pin mounting on main cam 113, and the latching members or pawls 125 and 126 pivotally carried by main cam 113, and member 127 pivotally carried at 120 by arm 115, are temporarily in an inoperative position with respect to size-control cam 111. Upon further upward movement of the support 25 the tomato will engage the outer end of the finger mechanism 112, slightly lifting the clamping elements 117 and 118 and causing them to be unlatched by a triggering action, later to be described, whereupon the element 117 is moved toward element 118 so that they will grip between them an end of a skin segment.

Figure 12:
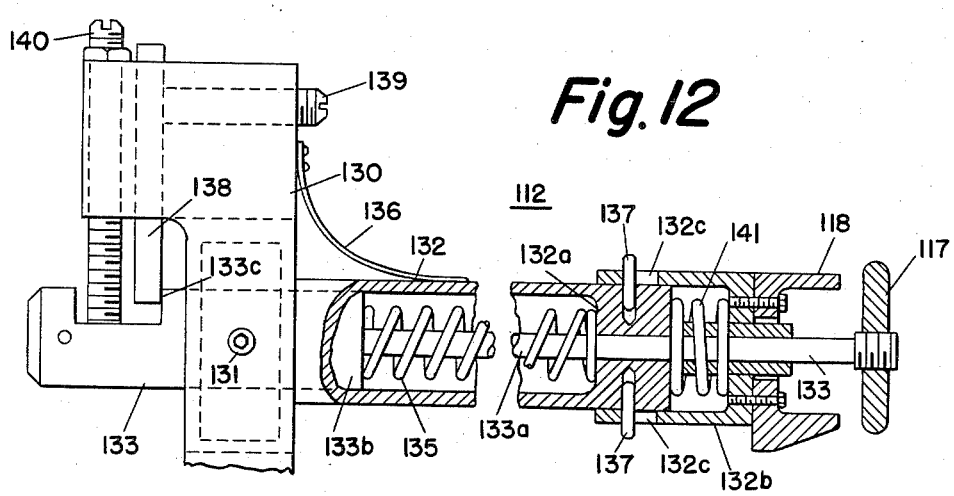
Fig. 12 is an elevation view on enlarged scale of the finger mechanism shown in Figs. 1 and 7–11.

Before continuing with the description of the skinning operation, it is believed it will be helpful first to refer to Fig. 12 which shows the construction of the finger mechanism 112 in detail. The finger mechanism 112 includes a frame member 130 fixed to the outer end of arm 115 for rotation of member 130 with arm 115 about pivot 200. The frame member 130 has pivoted thereto by pivot 131 a tubular extension 132 at the outer end of which is disposed the inner clamping element 118. Within the tubular extension 132 there is disposed a slidable rod member 133 at the outer end of which is carried the outer clamping element 117. The rod 133 is provided with a reduced diameter at 133a about which is disposed a compression spring 135 the opposite ends of which abuts against the enlarged diameter section 133b of rod 133 and the internal shoulder 132a of tubular extension 132 respectively. The outer end of tubular extension 132 is provided with a slidable section 132b to which is secured the inner clamping element 118. The section or bushing 132b is provided with slots 132c and is slidably connected to tubular extension 132 as by pins 137 that extend through slots 132c. The pivot 131 extends into the frame 130 but does not limit the movement of the slidable rod 133. Accordingly, the compression spring 135 will tend to move the slidable rod 133 to the left as viewed in Fig. 12. This action will move the outer clamping element 117 into engagement with the inner clamping element 118. In order to hold these clamping elements 117 and 118 in spaced relation during the insertion of a tomato skin segment therebetween, the frame member 130 is provided with a latching member 138 which is adapted to engage a shoulder 133c on rod 133. When the tomato engages the gripping finger 117 it will slightly raise the latter, pivoting rod 133 and tubular extension 132 about pivot 131 against the bias of a leaf spring 136, thereby causing the shoulder 133c to slip off the end of latching member 138, thus permitting the clamping elements 117 and 118 to be brought together due to force applied to rod 133 by means of compression spring 135. The latching action provided by cooperation of latching member 138 and shoulder 133c may be adjusted by means of set-screws 139 and 140.

When the finger mechanism 112 is triggered by the tomato, the main spring 135 operates with a substantial amount of force on the slidable rod 133 and in some instances the outer gripping element 117 might be snapped against the inner gripping element 118 with a force great enough to break the skin caught between the gripping elements 117 and 118. Accordingly, it is preferable to provide an arrangement whereby the full gripping force of the main spring 135 will be applied to the skin to provide the necessary gripping strength for the stripping operation but at the same time to provide a buffer arrangement whereby some of the excess energy during the initial gripping action will be absorbed. An arrangement of this type has been shown in Fig. 12 wherein there is provided a buffer spring 141 that normally biases outer bushing 132b to the right against pins 137 as shown in Fig. 12.

Returning now to the operation of the skinning mechanism 110 as a whole, as shown in Fig. 8, the finger mechanism 112 has been triggered or released thereby moving the clamping elements 117 and 118 into gripping engagement with the end of a skin segment S. This action occurred, as described above, upon the movement of shoulder 133c off latching member 138 thereby causing the rod 133 to move to the left under the bias of spring 135, Fig. 12. The distance that rod 133 moves corresponds to the space between clamping elements 117 and 118 in their open position as shown in Fig. 12 plus an amount corresponding to the compression occurring to buffer spring 141. In Figs. 7–10 it will be observed that latch 127, pivoted at 120, is bifurcated at its upper end for cooperation with a pin 134 carried by rod 133. When rod 133 moves to the left, as shown in Fig. 8, pin 134 causes latching pawl 127 to rotate counter-clockwise about pivot 120 thereby causing the L-shaped latching member 126 to rotate clockwise about its pivot 128 against the bias of leaf spring 148. Upon clockwise rotation of latching member 126, the pin 129 carried by pawl 125 will be released with respect to latching member 126, thereby permitting the end of pawl 125 under the bias of spring 203 to move into engagement with the teeth 142 on size-control cam 111. This action locks size-control cam 111 to the main cam 113 thereby preventing further vertical movement of the size-control cam 111, by roller 71, and thus continued upward movement of roller 71 with support 25 will cause the stripping mechanism 110 to rotate about the pivot 114, at the lower end of main cam 113. This pivotal action will be controlled by the composite shape of cams 111 and 113, and will act against the bias of spring 145 which is connected to a support 144 on the machine frame F and to an arm 146 on cam 113 near its lower end. Before the cam 113 is rotated about its pivot 114 the arm 146 is normally held against a stop member 147 on the machine frame, thus supporting the stripping mechanism 110 in a substantially vertical position.

Figure 9:
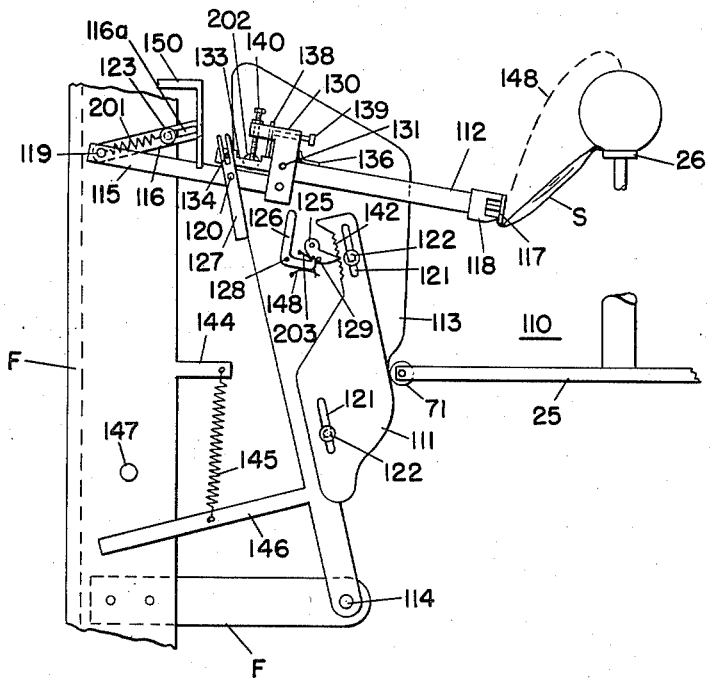

As shown in Fig. 9, upward movement of the roller 71 causes both of cams 111 and 113 to be pivoted counter-clockwise about pivot 114, thus causing the clamping elements 117 and 118 to move in a path indicated by the dotted line 148 as the tomato and its supporting structure are raised. The path of movement of the clamping elements 117 and 118 is controlled by the shape of cams 111 and 113 and by operation of arm 115 and link 116. The foregoing elements have been so constructed to move the clamping elements 117 and 118 and the skin segment S through a predetermined path at which time a minimum strain will be applied to the skin segment S as it is being removed from the tomato.

As shown in Fig. 9, the clamping elements 117 and 118, in removing a segment of skin from the tomato, follow an involute path as nearly as possible. By moving the clamping elements 117 and 118 through an involute like path, the skin blemishes and roots are drawn and removed with the skin in the direction of least resistance. Heretofore, when the tomato skins have been pulled off the tomatoes in random fashion as described above in connection with the prior art, it has not been possible to remove the skin blemishes and roots when the skins were removed but required an additional hand operation to remove them.

As the size-control cam 111 is movable vertically relative to main cam 113, their combined effective cam surface that is engaged by the cam follower or roller 71 may be varied individually with each tomato, thus providing a size-gaging operation on each tomato to assure that its skin segments will be pulled progressively from one end of the tomato to the other through the aforementioned predetermined path during the peeling operation.

Figure 10:
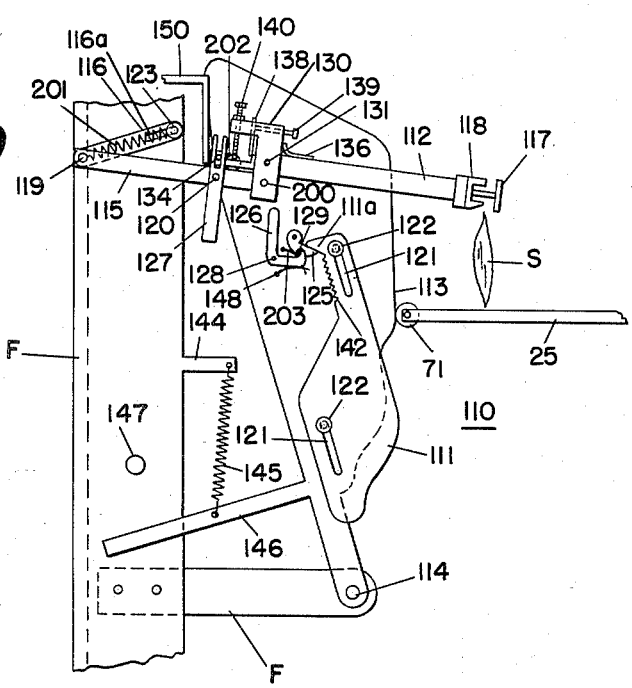
Figure 11:
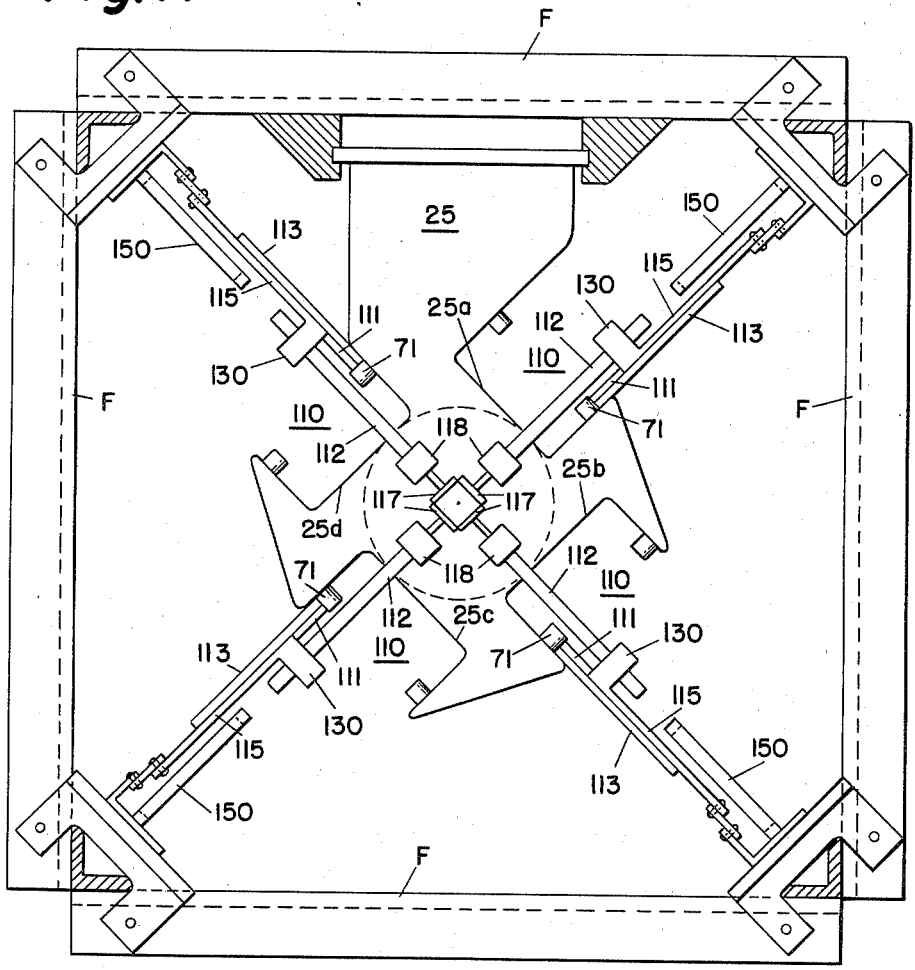
Fig. 11 is a plan view of the peeling zone V in Fig. 1.

Referring to Fig. 10, the skin segment S has been completely removed from the tomato and the stripping mechanism is ready to be relatched preparatory for operating on the succeeding tomato. When roller 71 moves off size-control cam 111, the latter due to its weight will drop down on its pins 122, and the projection 111a at the upper end of size-cam 111 will engage the pawl 125, rotating it in a clockwise direction and causing its pin 129 to be held in relatched position by the L-shaped latching member 126 under the bias of leaf spring 148. The inner end of rod 133 is moved against a stop member 150 carried by the machine frame and as the roller 71 moves up on main cam 113 further pivoting it in a counter-clockwise direction about pivot 114, the main spring 135, Fig. 12, is caused to be compressed between shoulders 132a and 133b, whereupon shoulder 133c is again moved in latching position with respect to latching member 138, To prevent further rotation of arm 115, Fig. 10, and consequently rod 133 about pivot 200 at this time, a stop 202 projecting from cam 113 now contacts the upper edge of bar 115. Thus, further movement of cam 113 to the left against the bias of spring 201 will result in a movement of the end of rod 133 against stop 150 to the left in a path that is substantially horizontal. This relatching action causes the clamping elements 117 and 118 to move to their spaced normal position as shown in Figs. 10–12, whereupon the skin segment S that has been removed from the tomato will now be released by the clamping elements 117 and 118. As the roller 71 continues its upward movement with the tomato and its support 25, the shape of cam 113 permits it to rotate in a clockwise direction about its pivot 114 to resume its original position as shown in Fig. 7 with the skinning mechanism 110 relatched preparatory to operating on a succeeding tomato. However, the roller 71 does not permit the cam 113 to return to original position until after the adjacent support 25 has moved beyond the finger mechanism 112. The four-finger mechanisms shown in Fig. 11 are held in a partially retracted position by corresponding rollers 71 and cams 113 for alignment with cut-away portions 25a—25d until the adjacent support 25 passes and a succeeding support 25 enters zone V.

When the tomato leaves the skinning zone of the machine, the skin, including any roots, blemishes or other imperfections, will have been completely removed from the meat of the tomato and the tomato will be ready to be ejected from the machine. Accordingly, the tomato moves from the skinning zone V of the machine to the ejecting zone VI of the machine.

Zone VI—Ejecting zone

Referring to Fig. 1, it will be seen that when the tomato leaves the skinning zone V it is near the upper end of the machine M and as the tomato supports 25 move over the top supporting wheel 11 of the endless conveyor 12, the tomatoes are caused to be removed from the supporting fixtures 26 and are ejected from the machine into a common area, such as a container or onto another conveyor, by any suitable means such as the slide member 152 diagrammatically shown in Fig. 1. After the skinned tomatoes have been removed from the machine, they are then ready for any subsequent operations that are desired, such as cooking, canning. etc.

Summarizing the foregoing, there have been described and illustrated improved apparatus for rapidly and automatically removing the skins from fruits or vegetables of the type having thin skins such as tomatoes that are ordinarily difficult to handle. The apparatus disclosed automatically cores, scores, deblossoms, treats and skins the tomatoes and during the skinning operation, by pulling the skin from the meat in a predetermined path closely approximating an involute curve; it removes the blemishes and roots and other imperfections appearing in the tomato skin that ordinarily cling to the tomato meat when the skin is removed by prior art methods. It will be noted that the various means for coring, scoring, topping and skinning have all been conditioned for operation automatically on the tomatoes by movement of the endless conveyor. Additionally, it will be noted that all of the operations including the treating and ejecting have been accomplished automatically in avoidance of the necessity of an operator handling the tomatoes between or during the various operations. Once the tomatoes are placed on the conveyor, further handling by an operator is unnecessary.

While the invention has been explained in connection with the skinning or peeling of tomatoes, it is to be understood that the term tomato has been used generically both in the specification and claims and the invention is not limited thereto, but is applicable to any fruit or vegetables having a similar skin and wherein similar skinning problems are involved.

It will be further understood, in connection with the action of elements 117 and 118 on the skin, that both in the specification and in the claims the terms gripping and clamping are used in a generic sense and each is intended to include the other as well as the term pinching. The terms skinning and peeling have been used as synonymous.

While there has been described a preferred embodiment of the invention, it will be understood that further modifications may be made without departing from the spirit and scope of the invention as set forth in the appended claims.

What is claimed is:

1. Apparatus for skinning fruit or vegetables having their skins scored into segments comprising means for supporting a fruit or vegetable with the score lines thereof running vertically, means for raising said supporting means along a predetermined path, gripping means disposed adjacent said path of said supporting means and including a pair of surfaces for gripping a skin segment therebetween while the fruit is on said supporting means, means associated with said gripping means for conditioning said gripping means comprising a size-control cam, a main cam supporting said size-control cam for limited vertical movement with said fruit-supporting means relative to said main cam, means associated with said fruit-supporting means and movable therewith for raising said size-control cam until the fruit engages said gripping means, and latching means on said main cam controlled by said size-control cam for conditioning said gripping means to cause said gripping surfaces thereof to grip said skin segment, said latching means limiting further upward movement of said size-control cam relative to said main cam, said size-control cam and said main cam thereafter being moved concurrently in a predetermined direction by said means movable with said fruit-supporting means to condition said gripping means for pulling said segment of the skin from the fruit in a predetermined path.

2. In a tomato-peeling machine for tomatoes having their skins scored into a plurality of segments, a peeling mechanism and a conveyor associated therewith to deliver scored tomatoes to said mechanism, said mechanism comprising a gripping device for gripping opposed surface areas of a portion of skin segments, said gripping device including a pair of cooperating surfaces biased towards each other for clamping an end of the skin segment therebetween, said gripping device further including latching means for holding said pair of surfaces in spaced relation preparatory to gripping therebetween an end of a skin segment, said latching means being released upon movement of a tomato by said conveyor into engagement with said pair of surfaces, size-control means associated with said gripping device to vary the operation of said peeling mechanism in accordance with the size of each individual tomato, and movable means associated with said conveyor to actuate said size-control means and said gripping device and pull said skin segment from the tomato through a predetermined path while the tomato is supported on said conveyor, said portion of said skin segment being supported by the gripping action of said gripping device on the opposite surface areas of said skin segment.

3. Apparatus according to claim 2 including means associated with said latching means and operable by advancement of said conveyor for automatically relatching said gripping device preparatory to peeling a skin segment from a succeeding tomato.

4. In a tomato-peeling machine for tomatoes having their skins scored into a plurality of segments, a peeling mechanism and a conveyor associated therewith to deliver scored tomatoes to said mechanism, said mechanism comprising a gripping device for gripping opposed surface areas of a portion of skin segment, size-control means associated with said gripping device, said size-control means including a two-piece cam having one piece movable relative to the other for automatically adjusting the shape of the cam surface to vary the operation of said peeling mechanism in accordance with the size of each individual tomato, and movable means associated with said conveyor to actuate said size-control means and said gripping device and pull said skin segment from the tomato through a predetermined path while the tomato is supported on said conveyor, said portion of said skin segment being supported by the gripping action of said gripping device on the opposite surface areas of said skin segment.

5. Apparatus according to claim 4 wherein said peeling mechanism includes structure associated with said size-control means for controlling said path to closely approximate an involute curve.

6. Apparatus according to claim 4 wherein said gripping device includes a pair of cooperating surfaces biased towards each other for clamping an end of the skin segment therebetween.

7. A machine for peeling tomatoes having their skins scored into a plurality of segments comprising a frame structure, a peeling mechanism and a conveyor associated therewith mounted on said frame structure to deliver scored tomatoes to said mechanism, means on said conveyor to maintain said scored tomato in fixed position relative to said conveyor with the leading end of the scored skin segments disposed outwardly of the conveyor, said peeling mechanism comprising a gripping device having a pair of cooperating clamping members biased towards each other for clamping therebetween opposed surface areas of a portion of a skin segment of the tomato, and holding means associated with said gripping device for holding said members apart against said bias, said conveyor being adapted to move a tomato against said gripping device with the end of a skin segment between said pair of members for automatically releasing said holding means and causing said pair of members to be biased into clamping relation with said skin segment.

8. Apparatus according to claim 7 wherein said peeling mechanism includes a plurality of gripping devices, one for each of the segments of the plurality into which the skin of each tomato has been scored, said gripping devices being disposed around the path of movement of the tomatoes.

9. Apparatus according to claim 7 wherein said peeling mechanism includes means operated by movement of said conveyor to move said gripping device out of engagement with the tomato after it has gripped said end of said skin segment and to control the movement of said gripping device in a predetermined path so as to move said skin segment outwardly of and about the tomato progressively from said leading end to the other end to minimize tension on the skin for removal thereof in substantially whole segments.

10. Apparatus according to claim 7 wherein said peeling mechanism includes size-control means for automatically varying the operation of said peeling mechanism in accordance with the size of each individual tomato as it is conveyed to said machine.

11. A machine for peeling tomatoes having their skins scored into a plurality of segments comprising a peeling mechanism and a conveyor associated therewith to deliver scored tomatoes to said mechanism, said peeling mechanism comprising a gripping device having a pair of cooperating clamping members for clamping therebetween opposed surface areas of a portion of a skin segment of the tomato, one of said clamping members being carried by a tubular member, the other of said clamping members being carried by a rod member having an enlarged diameter section slidable within a chamber of said tubular member, force-applying means for forcing said clamping members together, said force-applying means being disposed within said chamber in said tubular member and in communication with the adjacent end of said enlarged diameter section, and means for controlling said force-applying means to hold said clamping members in spaced relation until the end of a skin segment is inserted therebetween, said control means being automatically adjusted by movement of the tomato by said conveyor to a predetermined position relative to said clamping members for releasing the force of said force-applying means to move said clamping members together and into gripping relation with a skin segment therebetween.

References Cited in the file of this patent

UNITED STATES PATENTS

| | | |
|---|---|---|
| 1,312,332 | Kirino | Aug. 5, 1919 |
| 1,992,995 | Denner et al. | Mar. 5, 1935 |
| 2,123,187 | Ewald | July 12, 1938 |
| 2,255,048 | Ewald | Sept. 9, 1941 |
| 2,277,003 | Polk | Mar. 17, 1942 |
| 2,300,773 | Carroll | Nov. 3, 1942 |
| 2,475,142 | Kane | July 5, 1949 |
| 2,545,718 | Weber | Mar. 20, 1951 |
| 2,549,326 | Moore | Apr. 17, 1951 |
| 2,696,633 | Hincks | Dec. 14, 1954 |
| 2,703,123 | Buck | Mar. 1, 1955 |